April 25, 1961 A. A. ROOT 2,981,444
SQUEEZE-TO-USE TYPE CONTAINER
Filed March 28, 1956 5 Sheets-Sheet 1
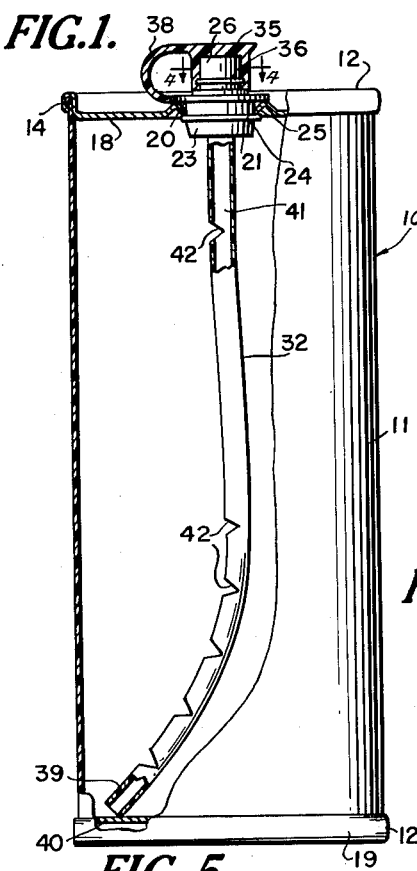
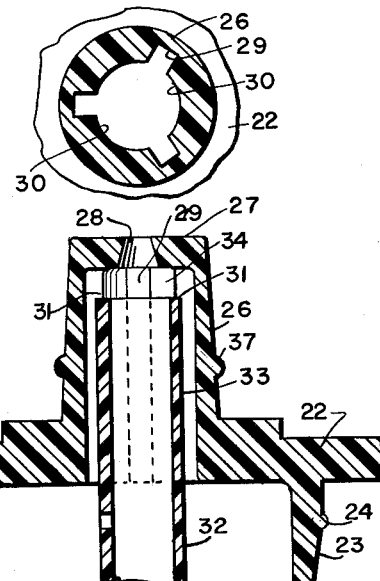
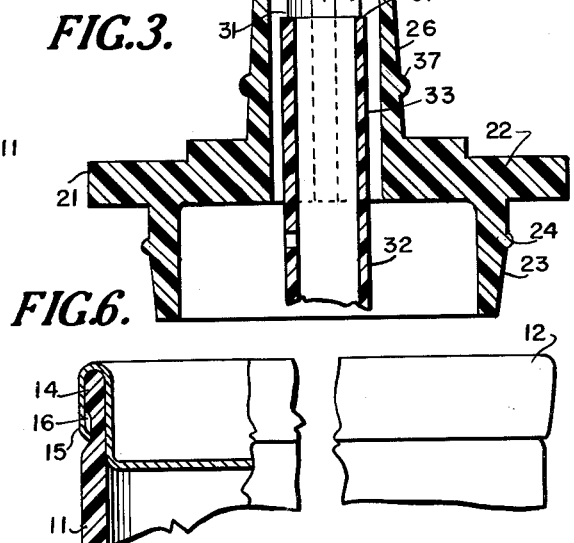
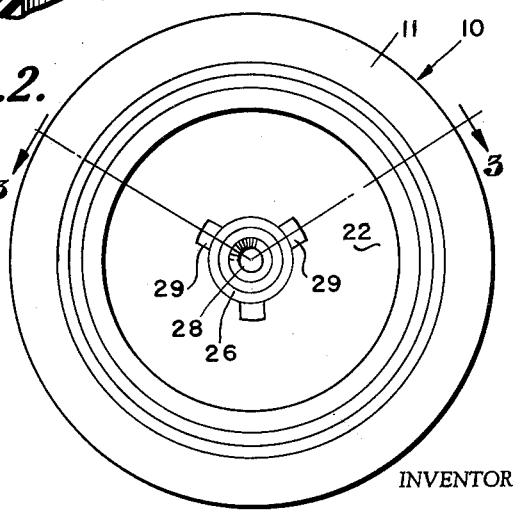
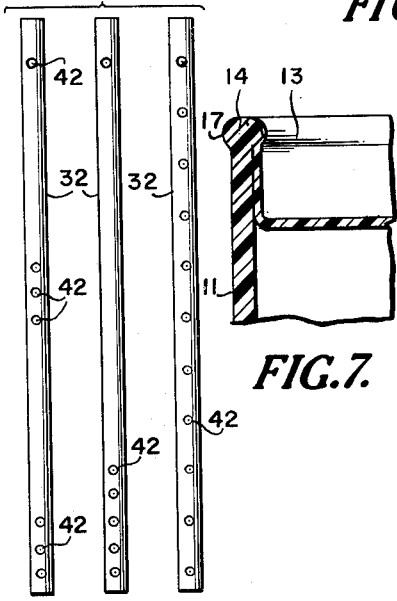
INVENTOR
ANDREW A. ROOT
BY
ATTORNEYS

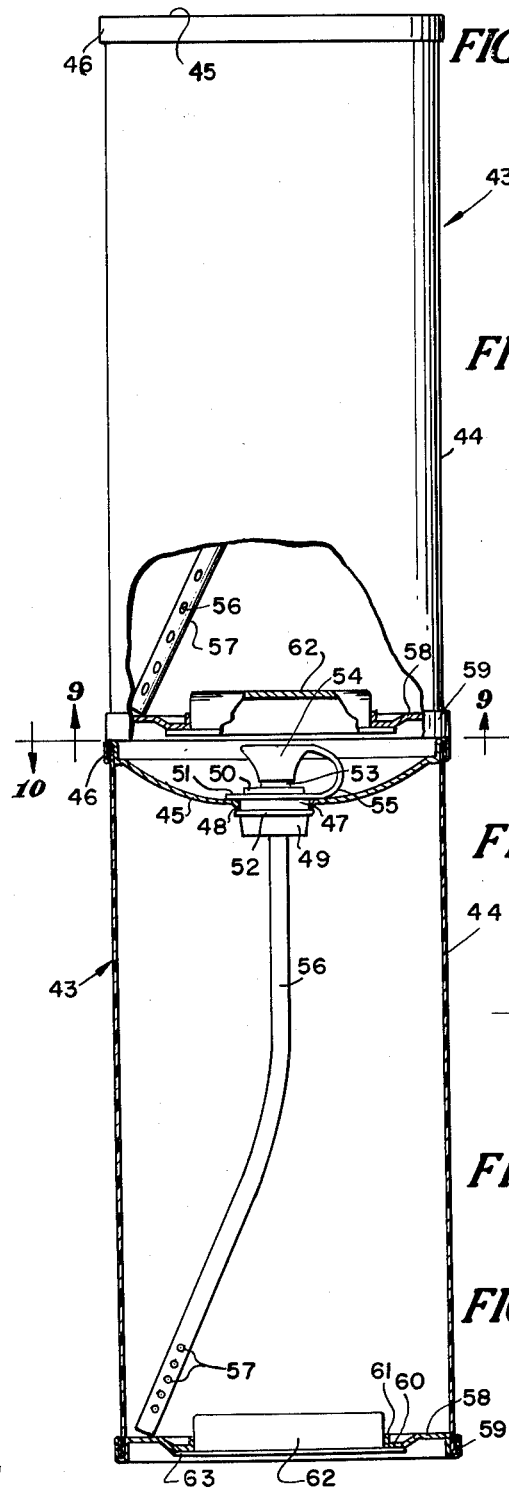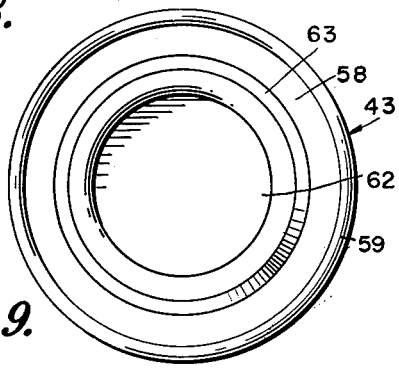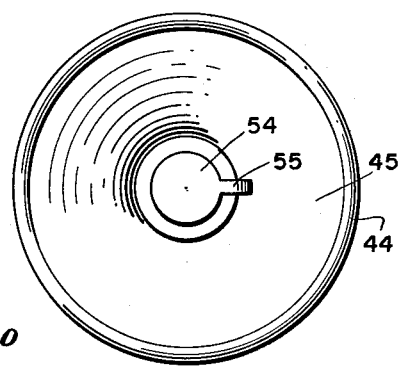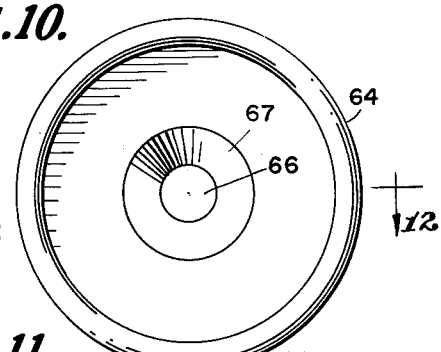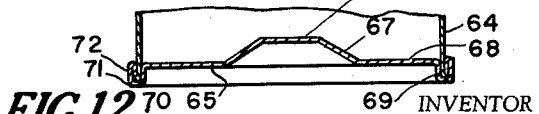

April 25, 1961 A. A. ROOT 2,981,444
SQUEEZE-TO-USE TYPE CONTAINER
Filed March 28, 1956 5 Sheets-Sheet 3

INVENTOR
ANDREW A. ROOT
BY
ATTORNEYS

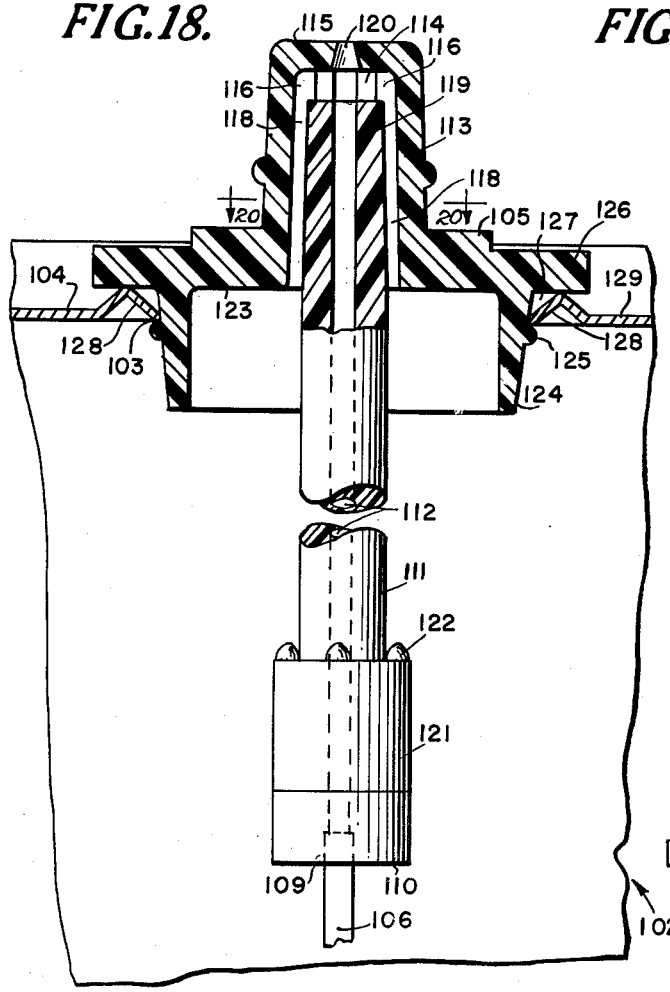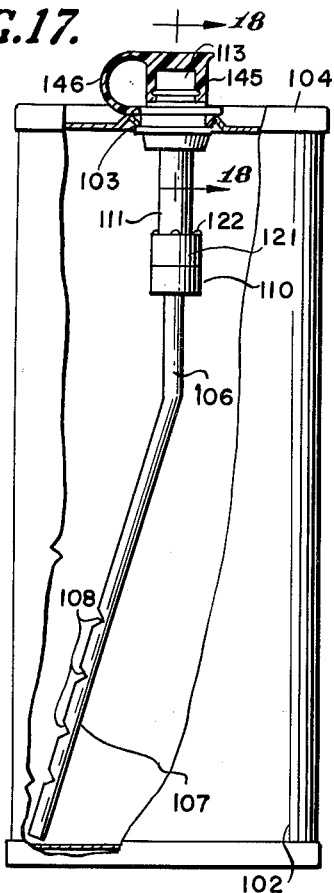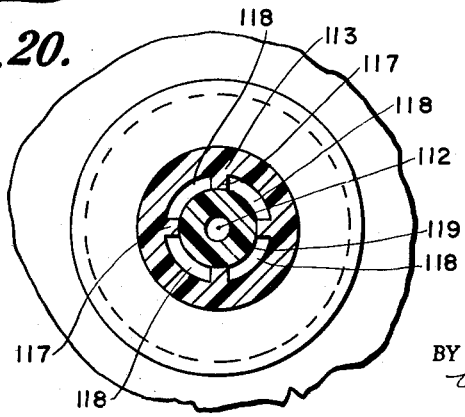

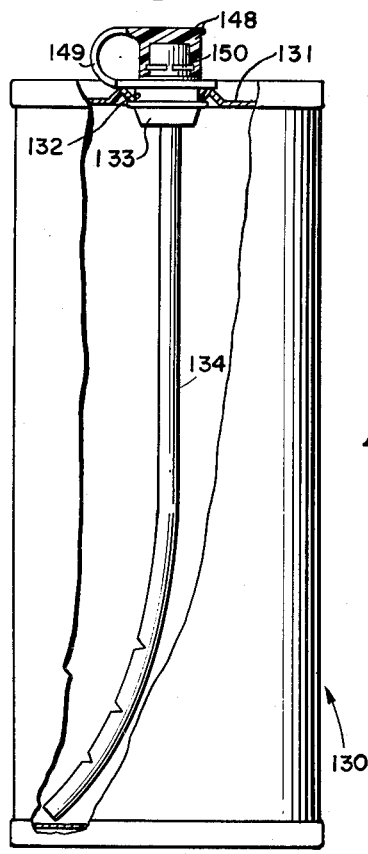
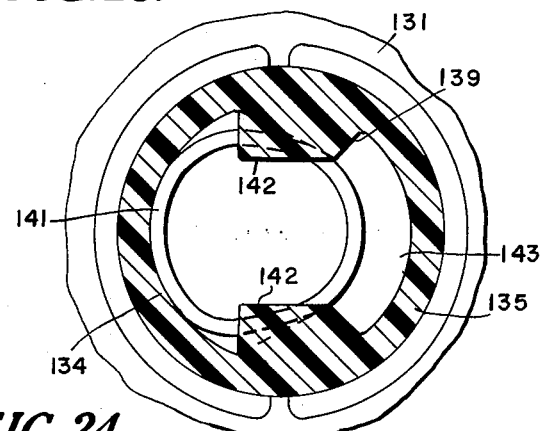
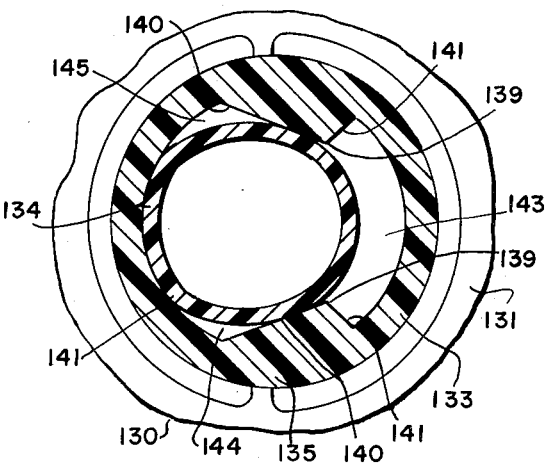
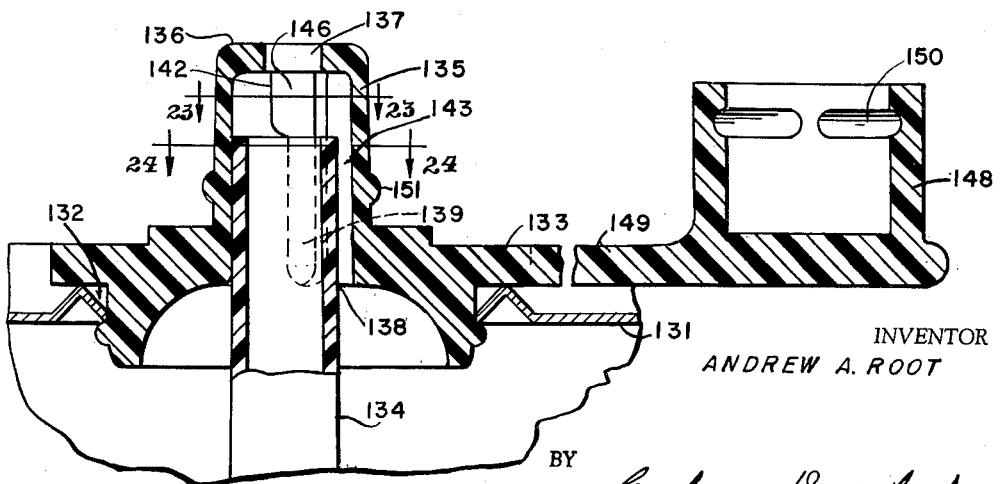

United States Patent Office 2,981,444
Patented Apr. 25, 1961

2,981,444
SQUEEZE-TO-USE TYPE CONTAINER

Andrew A. Root, Concord, Mass., assignor, by mesne assignments, to American Can Company, New York, N.Y., a corporation of New Jersey Filed Mar. 28, 1956, Ser. No. 574,455

11 Claims. (Cl. 222—193)

The present invention relates to improvements in the construction and operation of containers of the squeeze-to-use type.

An important object is to provide a simple, efficient, economical, and durable plastic flexible container or package for dispensing pulverous material, such as talcum powder, insecticides, and the like in a puffing or dusting action, and under sufficient pressure to thoroughly cover a specific area.

A further object is to provide means for insuring a proper mixture of the air in the squeeze-to-use container above the pulverized material, with the material prior to its discharge from the container when the latter is squeezed.

A squeeze-to-use container possesses certain peculiar characteristics which are totally different from ordinary containers whose only function is a package for material. An efficient squeeze-to-use container must have the correct balance between wall flexibility and stiffness to produce the proper action for expelling the contents. The body material must be extremely flexible in order for the container wall to be collapsed with a minimum of pressure. Yet in order for the container to have the proper recovery, that is, spring back to its normal shape after squeezing, the body wall must have a certain amount of stiffness. In order to withstand multiple flexing as the container is squeezed during its useful life, the container wall material must have great tensile strength and resistance to fatigue.

Accordingly, a further object is to provide an improved durable squeeze-to-use plastic container which is adaptable to high speed fabrication and production. The container is formed with a cylindrical thin flexible plastic body of uniform thickness and may be closed by end pieces formed of plastic or metal. One of the end pieces is provided with a central opening from which extends outwardly therefrom a tubular plug having a restricted discharge orifice shaped to receive the upper end portion of a feed tube in the container and provided with longitudinally spaced holes or small openings for withdrawing the material from the container and conducting it upwardly and through the orifice in the plug, when the body of the container is squeezed.

A further object consists in forming each of the flexible plastic containers with rigid end closures made of either plastic or metal. One of said end closures being of substantially concave or dish-like shape so that the plug associated therewith may extend outwardly therefrom but not beyond the adjacent end of the container, in order that the containers when in an upright position can be stacked or placed one above the other without danger of damaging the plugs. The opposite end closure of each container may be provided with a centrally disposed raised or offset portion and is suitably secured or clamped to the adjacent end of the container in order to provide a permanent tight seal when the parts are assembled.

For some squeeze-to-use containers to produce satisfactory dispensing or puffing action with pulverized material, such as powder, and regardless of the position of the container or package, means must be provided to insure a proper mixture of the air and powder as they are discharged from the container. Otherwise, too much air and not enough pulverized material will be dispensed from the container when the latter is squeezed. Accordingly, an important object is to associate with the container, a feed tube having an air hole or orifice adjacent the top of the container, and controlling the opening of this orifice by a sleeve valve. Thus, when the container is in an upright position, the sleeve valve will be closed so as to insure a proper mixture of the air and powder being discharged from the container. The sleeve valve is also used to control the air passages in the plug mounted on the top of the container, so as to prevent the pulverized material in the container from clogging or packing in the air passages or grooves in the plug. Thus, the sleeve valve has a dual function, since it provides means for insuring the proper mixture of the air with the powder and also prevents the powder interferring with the free discharge of the air from the container, when the latter is tilted or in an upside down position.

A still further object comprehends the provision of coupling means interposed between the feed tube and the closure plug for controlling the amount of air discharged from the container so as to insure a proper mixture of the air with the pulverized material or powder prior to the discharge of the same from the container, and also improve the asperating effect.

Another object consists in associating with the air passages in the closure plug, means for preventing the material in the container from working its way into the air passages and becoming packed therein, when the container is in either its upright or inverted position.

A further object consists in providing a rigid feed tube having a permanently bent lower end portion extending laterally and outwardly therefrom, so as to be positioned adjacent the lower corner or bottom of the package, such as a powder puffer container, so as to insure the emptying of the material from the package and which also allows the package to be filled through the bottom by a filling machine without danger of contacting or damaging the feed tube.

A still further object is to provide the plug on the container with a reduced tubular neck portion, the inner wall of which is formed with one or more passages for causing the air in the container to mix with the powder or pulverized material as the latter is discharged from the container. Additionally, the inner wall of the tubular portion of the plug has spaced depending lugs or ribs that constitute stops for limiting the upward movement of the feed tube into the plug. The feed tube is inserted into the neck of the plug in such a manner as to provide air passages between the outer wall of the plug and the inner wall of the neck, the passages being of such a length as to communicate with the interior of the container and a mixing chamber formed between the upper end of the feed tube and the top of the neck by the lugs, when the parts are assembled.

Other objects and advantages of the invention will become apparent from the following description, when taken in conjunction with the accompanying claims and drawings.

Referring to the drawings wherein is shown several preferred embodiments the invention may assume:

Figure 1 is a side view, with parts in section, of a flexible container constructed in accordance with the present invention;

Figure 2 is an enlarged bottom plan view of Figure 3, looking upwardly therefrom;

Figure 3 is a sectional view taken substantially along the line 3—3 of Figure 2;

Figure 4 is an enlarged sectional view taken substantially along the line 4—4 of Figure 1, with the cap removed;

Fig. 5 is a side view of a group of flexible feed tubes which may be used with the container;

Figure 6 is a detailed sectional view of the upper portion of a flexible plastic container having a metal end closure clamped thereto;

Figure 7 is a view similar to Figure 6 showing a plastic rigid end closure fused to the adjacent plastic edge of the container;

Figure 8 is a side view with parts in section, showing a modified form of the invention and with the containers in an upright position stacked one upon the other;

Figure 9 is a sectional view taken substantially along the line 9—9 of Figure 8;

Figure 10 is a sectional view taken substantially along the line 10—10 of Figure 8;

Figure 11 is a bottom plan view of another modification;

Figure 12 is a sectional view taken substantially along the line 12—12 of Figure 11;

Figure 17 is a side view of a further modification with parts in section;

Figure 18 is an enlarged sectional view taken substantially along the line 18—18 of Figure 17;

Figure 19 is a detailed perspective view of the slidable sleeve shown in Figure 17;

Figure 20 is a sectional view taken substantially along the line 20—20 of Figure 18;

Figure 21 is a side view of another modified form of squeeze-to-use container;

Figure 22 is an enlarged vertical sectional view of the plug assembly and its associated parts, as shown in Figure 21, with the cap in its extended or opened position;

Figure 23 is an enlarged sectional view taken substantially along the line 23—23 of Figure 22; and Figure 24 is an enlarged sectional view taken substantially along the line 24—24 of Figure 22.

Figure 13:
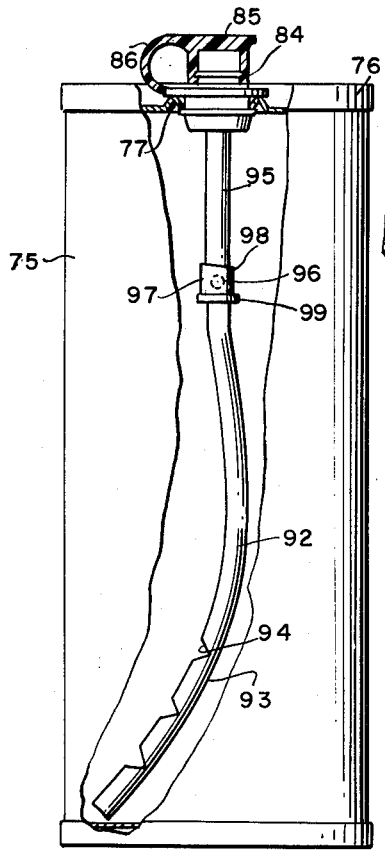
Figure 13 is a side view of a modified form of flexible container with parts in section and provided with a slidable valve sleeve for controlling the flow of the air.
Figure 14:
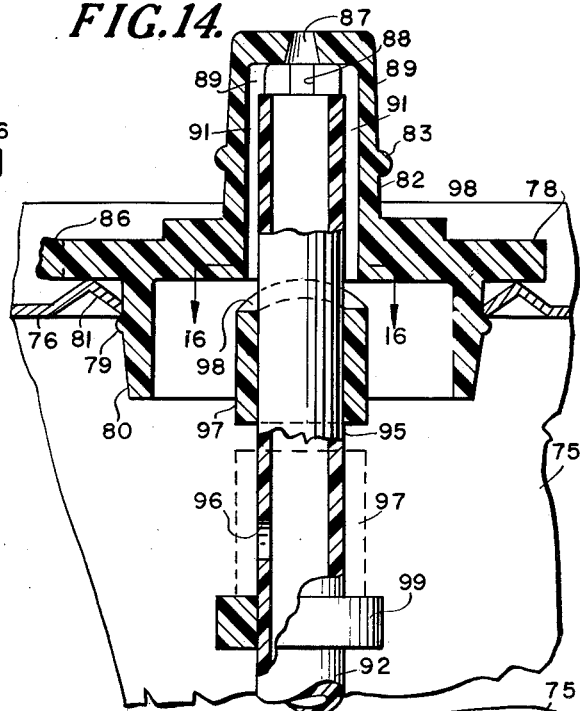
Figure 14 is an enlarged detailed sectional view of the plug assembly shown in Figure 13.

Referring to the drawings, 10 indicates a container of the squeeze-to-use type constructed in accordance with the present invention, and includes a substantially cylindrical hollow body 11 which may be made of any suitable flexible plastic material, such as polyethylene, polyvinyl chloride, or the like. The wall of the body 11 is relatively thin, yet is formed from a stable and tough material having the softness, flexibility, and resilience characteristics of plastics, such as polyethylene or plasticized polyvinyl chloride. The selection of conventional plasticizers will be determined, so as to give softness enough to afford squeezeability and stiffness enough to assure immediate return of the flexible body to its initial shape when pressure is released after the body has been squeezed or compressed. The hollow or tubular cylindrical body 10 may be closed at its opposite ends either by a thin metal closure, such as 12, shaped as shown in Figure 6, or a plastic closure 13, such as shown in Figure 7. The metal closures 12 (Fig. 1) when used to close opposite ends of the body 11 may each be fastened to the adjacent end portion 14 (Fig. 6) of the plastic body, by the inwardly extending annular flange 15 which is clamped or crimped into an annular recess 16 in the outer wall of the body 11 in any suitable manner, such as by the conventional seaming equipment used for closing metal cans or the like. If the ends of the container are closed by a thermoplastic closure 13 (Fig. 7), each of the closures 13 may be separately mounted and integrally fastened by fusion, so as to form a molten compressed bead 17, in order to provide a permanent tight seal therewith.

When the container is in an upright position as shown in Figure 1, it may be considered to be formed with an upper end closure or top 18 and a lower end closure or bottom 19. The upper end closure 18 has a centrally disposed opening 20 (Fig. 1) through which the contents in the container 10 may be expelled and which preferably is provided with a plastic solid rigid plug or member 21 having a horizontal or transverse flat base 22 (Fig. 3) provided with a depending annular skirt 23 of substantially the same diameter as the opening 20, so as to frictionally engage the wall thereof and be releasably retained in position by an annular locking bead 24 that engages the adjacent circular wall 25 of the opening 20 when the parts are assembled. Extending upwardly and centrally from the base 22 is a reduced tubular portion 26 having a closed end or top 27 provided with a centrally disposed restricted orifice 28. The inner wall of the tubular portion 26 is provided with circumferentially spaced vertical grooves or slots 29, three of which are shown for the purpose of illustration, and which extend axially from the underside of the top 27 to the bottom of the base 22, so as to provide air passages that communicate with the interior of the body 10 through the skirt 23, when the parts are assembled.

The inner wall of the tubular portion 26 is provided with segmentally spaced sections 30 (Fig. 4) positioned between the grooves 29 and forming radial stop shoulders 31 that engage the adjacent end of a flexible feed tube 32 positioned within the container 10, and which has an upper end portion 33 thereof projecting into the tubular portion 26. The end of the portion 33 is moved inwardly into the tubular portion 26 to abut the shoulders 31 so as to be maintained in a fixed position therein. The space between the upper end of the tube 33 and the top of the tubular portion 26 formed by the sections 30 provides a mixing chamber 34, which communicates with the grooves 29 and the feed tube 32 below the discharge orifice 28. A plastic cap 35 is arranged to fit over the tubular portion 26 of the plug 21, so as to close the orifice 28 and may have an annular groove 36 in the inner wall thereof (Fig. 1) for releasably receiving a complementary formed bead 37 on the tubular portion 26 when the cap is moved to its closed position. The cap 35 is connected to the base 21 preferably by a short plastic flexible integral strap 38.

The feed tube 32 is of slightly longer length than the interior length of the container 10, so that the lower end portion 39 of the tube has to be bent slightly in order to rest on the bottom 40 when positioned within the container. The tube 32 is provided with a small feed bore 41 and with longitudinally or axially spaced holes or small openings 42 which may extend the full length of each tube or which may be spaced in various arrangements such as shown in Figure 5 of the drawings. Due to the fact that the length of the feed tube 32 is greater than the axial length of the container, the lower end portion 39 of the feed tube will be positioned along the interior side of the bottom 40 and will extend outwardly toward the inner wall of the body 10, so that all the material in the container may be expelled and the container completely emptied before being thrown away or refilled.

The squeeze-to-use container when filled with any suitable pulverous material, such as talcum powder, insecticide powder, and the like, may be readily and efficiently brought into operation by removing the cap 35 from the end portion 26 of the plug 21. Upon the application of inward pressure on the flexible body 10, the same is collapsed with the result that the powder in the container is forced through the holes 42 in the feed tube 32 and upwardly through the mixing chamber 34 and then through the discharge orifice 28. During this operation, it will be observed that the powder or pulverulent material in the container 10 is forced through the tube 32 by the pressure of the air above the powder in the container and mixes with the air in the chamber 27 so as to be simultaneously expelled therewith through the orifice 28. Moreover, as the quantity of powder within the container is diminished, more air is introduced into the container through the grooves 29 and a portion of this air is expelled from the container into the groove 29 and mixing chamber 34, so as to insure the powder being discharged from the container in the form of a fine fog or mist and, under sufficient pressure, as to cover a substantial area of the space or object being treated.

The plug 21 may be releasably inserted in tight frictional engagement with the wall of the opening 20 of the container or it may be integrally formed on the upper end of the plastic end closure 13, so as to provide a relatively small discharge orifice. The flexible plastic wall of the body 11 is of uniform thickness and preferably in a range between .010" to .050". The variations in the thickness and tolerance of the wall of the body 11 should not be over 5 to 10% of the specified or normal wall thickness, particularly when the end closures 12 are made of metal (Fig. 6) and is seamed onto the ends of the container, since it is very important during this crimping action that the plastic thin wall of the container is not perforated thereby.

The plastic material employed in the body wall 11 is a stable and tough material having the softness, flexibility and resilience characteristics of plastics, such as polyethylene or plasticized polyvinyl chloride. The selection of conventional plasticizers will be determined, so as to give softness enough to afford squeezeability and stiffness enough to assure return to shape and plasticity enough to allow deformation to produce a strong, permanent joint without cutting through. The squeeze-to-use container of the present invention exhibits great bursting strength with a wall thickness within the ranges specified. Laboratory tests have been made with flexible plastic containers of 1½" in diameter and 5" long with a .032" wall thickness, using up to 50# p.s.i. internal pressure, with no evidence of failure. Preferred materials used in the present invention do not become brittle or crack with age, or at extremely low temperature, and tests have shown that, when made of polyethylene, they will remain flexible down to minus 10° F. In other words, such containers are capable of maintaining the exacting demands required for the efficient and practical use of such containers.

Thus, it will be seen that, upon manually squeezing the flexible body or the side wall of the container, the upper layer or portion of the packed powder is disturbed and the air pressure built up inside the container causes the powder thus disturbed to be forced through the transverse holes 42 in the tube 32 and out through the discharge orifice 28 after first being mixed with the air in the chamber 34. The internal diameter of the feed tube 32, as well as the spacing and size of the transverse holes 42 are so arranged as to obtain maximum efficiency and the expelling of the contents or powder at a minimum expenditure of time, effort, and cost.

In the modified form of the invention shown in Figure 8, each of the flexible containers 43 is constructed and arranged so that, when in an upright position, they may be firmly stacked or positioned one above the other without danger of falling or interfering with each other. As shown, each of the containers 43 includes a flexible cylindrical body 44 formed of any suitable thermoplastic material and of any desired size. The upper open end of the body 44 is closed by a substantially concave or dish-shaped metal cap 45 having an annular depending flange 46 arranged to be clamped or otherwise firmly secured to the adjacent edge of the body 44, so as to provide a tight permanent seal therewith. The cap 45 has a centrally disposed opening 47, the wall of which may be bent downwardly to form an annular retaining flange 48 for receiving the tapered portion 49 of the plastic plug 50. Preferably, the yieldable flange 48 is confined within an annular shoulder 51 and a spaced rib or bead 52 on the plug, so as to firmly maintain the plug in a releasable fixed sealed position. The plug 50 is substantially of similar construction to the plug 23, previously described, and has its upper tubular portion 53 closed by a removable plastic cover or lid 54 connected by a flexible strap 55 to the plug. A flexible feed tube 56 has its upper end extending into the plug 50 and its lower end portion provided with longitudinally spaced small openings or notches 57 for withdrawing the pulverous material in the container 43 therefrom when the flexible body 44 is pressed or squeezed.

The bottom of each of the containers 44 is closed by a metal cylindrical plate or disk 58 having an outer annular flange portion 59 bent to overlap the adjacent end of the cylindrical container 44, so as to be clamped, crimped, or otherwise firmly secured thereto. The plate or disk 58 may be formed with an annular depressed portion 60, which terminates in a central opening having an annular inwardly extending flange 61 for frictionally engaging a releasable bottom cap or closure 62 provided with an annular flange portion 63 arranged to overlap and abut the adjacent side of the plate 58 when the cap is inserted into the opening, so as to limit the inward movement thereof. It will be seen that the removal connection of the cap 62 with the plate 60, provides means for filling or refilling the container 44 through the bottom thereof, so that the same may be conveniently used as a powder-puffer container or the like.

In the modified form of the invention shown in Figures 11 and 12, the flexible container body 64 may be substantially similar in construction to the container 10 or 44, in order that each upright container may be stacked one above the other without any projecting parts interfering with the proper positioning of the containers. However, the bottom or end closure 65 instead of having a removal closure, is formed to provide a completely closed end and may preferably be made of any suitable light metal having a centrally raised or offset portion 66 (Fig. 12) provided with a downwardly diverging annular portion 67 which terminates in a transverse horizontal flat portion 68 having a depending annular flange 69 which may be bent outwardly as at 70, so as to engage the lower end of the cylindrical body 64 and then bent upwardly and inwardly as at 71 and 72, so as to be firmly clamped or embedded into the body to form a permanent tight seal. The centrally raised portion 66 in the bottom 65 of the container provides a space for receiving the adjacent upper end of a similarly formed container when the same have projecting nozzle and are stacked in an upright position one upon the other, so that the lower container will not prevent the upper container from being firmly positioned thereon. If the concave top 45 (Fig. 9) is deep enough so that the top of the cap 54 is beneath the outer rim of the concave top, a flat bottom container, such as the container 10 (Fig. 1), may be used without affecting the stacking feature.

It has been established that, for some materials in order to produce satisfactory dispensing or puffing action with powders or the like, regardless of the position or orientation of the container or package, certain structural refinements should be made to enhance the efficiency of operation of the squeeze-to-use container and insure a proper mixture and discharge of the powder and air from the container. Accordingly, as disclosed in Figures 13, 14, 15, and 16, the container 75 has its top or lid 76 provided with a central orifice 77 for receiving the plug 78 that is substantially similar in construction and shape to the plug 21, previously described, and which is maintained in a fixed position on the container by having an externally annularly disposed bead 79 formed in the skirt 80 and arranged to engage the angularly disposed or inclined yieldable flange 81 formed by the wall of the orifice 77. The plug 78 has extending upwardly therefrom a centrally disposed reduced tubular portion 82 provided with an annular bead 83 for releasably fitting within a complementary formed groove 84 in the closure cap 85 that is connected to the plug by a flexible portion or strap 86 (Fig. 13). The top of the tubular portion 82 has a central tapered aperture 87 that communicates with a mixing chamber 88 formed by the inwardly extending circumferentially spaced horizontal lugs 89 which, in turn, constitute an extension of the vertically spaced ribs or lands 90 (Fig. 16) that are circumferentially spaced from each other for forming the segmental shaped air passages 91, that extend from the underside of the plug 78 upwardly into the mixing chamber 88 that communicates with the discharge aperture 87. Thus, it will be seen that, when the flexible body 75 is squeezed, the air within the same above the powder or pulverous material is forced upwardly into the chamber 88 to mix with the powder prior to discharge of the same through the opening 87.

A flexible feed tube 92 is positioned within the container 75 and has a lower portion 93 provided with axial or longitudinally spaced holes or notches 94 and an upper end portion 95 which extends to the tubular portion 82 of the plug, so that its upper end abuts the circumferentially disposed lugs 89, in order to allow the powder forced into the tube 92, when the container 75 is squeezed, to mix with the air passing upwardly through the passages 91, prior to the mixture being discharged through the aperture 87. The upper portion 95 of the tube 92 has an opening 96 spaced from the plug 78 and is arranged when the container 75 is in a vertical or upright position, to be closed by an axially slidable sleeve valve or ring member 97 which may be provided at its upper edge with an inclined surface 98 or the like, for a purpose subsequently to be described. The downward movement of the sleeve 97 of the feed tube 90 is limited by a fixed shoulder or collar suitably connected to the tube 90 at a point below the opening 96.

Figure 15:
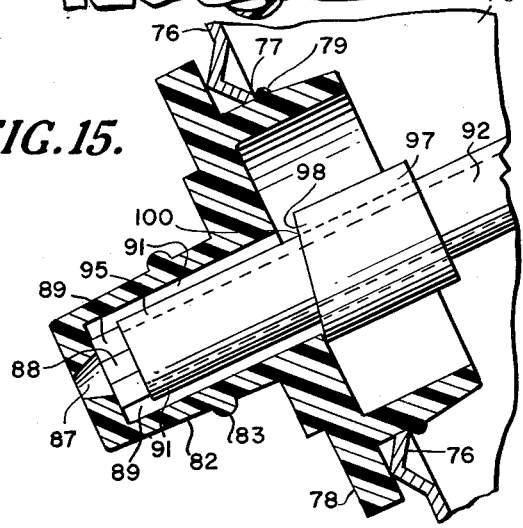
Figure 15 is a sectional view similar to Figure 14 but showing the parts in their tilted or inverted position.
Figure 16:
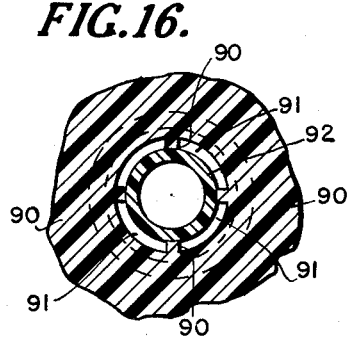
Figure 16 is a sectional view taken substantially along the line 16—16 of Figure 14.

The opening 96 is located in the upper portion of the feed tube 90, to provide means for insuring the proper dispensing of the powder when the container is tilted or moved to an upside down position (Fig. 15). In this inverted position, the sleeve or ring member 97 slides on the upper portion 95 of the tube to the position, as shown in Figure 15, so as to uncover the opening 96 and, at the same time provide guard means spaced from the bottom of the passages 91 for preventing packing of the pulverized material into the passages 91, due to the weight of the valve sleeve 97 or the other pulverized material in the package or container pressing on it.

It will be noted that, when the container is tilted to the position, as shown in Figure 15, the upper inclined edge or surface 98 completely cuts off one of the passages 91 but provides a restricted space, as at 100, with the remaining passage 91, so as to prevent the packing or clogging of these passages. Instead of the upper end of the sleeve 97 being inclined, it may be provided with a chamfered edge, or the upper edge may be relieved in any other suitable manner to establish communication with certain of the passages 91, in order to prevent the clogging of the pulverized material in the axial grooves 91.

Thus, it will be seen that, by reason of the provision of the opening 96 and the axial slidable sleeve valve 97, simple, efficient, and positive means are provided for insuring the proper mixing and dispensing of the powder and air when the containers 75 are tilted or inverted. Moreover, when the container is in its upright or vertical position, if the opening 96 is not closed, it would combine with the axial channels 89 to increase the air ports and allow too much air to be conducted to the mixing chamber 88 and not enough of the pulverized material. Consequently, by reason of the sleeve 97 closing the opening 96 when the container is in its vertical position and being moved to control the communication of the axial grooves 91 with the interior of the container during the pouring or tilting operation, dual means are provided for insuring a proper mixture of the air and powder in the chamber 88 prior to the discharge of the same through the opening 87 independent of the position of the flexible container.

In the modified form of the invention disclosed in Figures 17 to 20, inclusive, the flexible squeeze-to-use container 102 has the opening 103 in the top or lid 104 closed by a plastic plug 105 substantially similar in construction and operation to the plugs 21, and 78, previously described. The rigid feed tube 106 is positioned within the flexible container 102 and of such a length as to have a lower permanently bent portion 107 having the notches or openings 108 for allowing the pulverized material or powder in the container, to be moved upwardly through the tube 106 and be discharged therefrom, when the flexible wall of the container is squeezed. The upper end of the tube 106 fits within a recess or socket 109 (Fig. 18) in the lower enlarged shoulder or collar portion 110 of a coupling 111, which may be in the form of a cylindrical metallic sleeve or tubular member that has an axial bore 112 extending therethrough into the reduced portion or neck 113 of the plug 105, so as to communicate with a mixing chamber 114 formed between the top 115 of the plug and the upper end of the coupling 111 by the circumferentially spaced lugs 116 which extend radially or laterally from the vertical ribs 117 that form the segmental spaced air passages 118 when the upper portion 119 of the coupling 111 is inserted into the neck 113, so as to abut the bottom of the spaced lugs 116, in order to form the mixing chamber 114. The top of the neck 113 has an aperture 120 through which the material mixed with the air in the chamber 119 discharges when the flexible body of the container 102 is squeezed.

Surrounding the coupling 111 between the shoulder 110 and the plug 105 is a slidable sleeve or ring 121 which as shown, is provided on its upper edge with circumferentially spaced projections 122 arranged when the container is tilted or inverted, to be moved upwardly into engagement with the underside 123 of the plug to form circumferentially spaced passages that communicate with the passages 118 in the neck, so as to prevent the packing of the pulverized material into the passages 118 which would occur if these passages were closed by the sleeve 121 when the container is tilted or inverted. Manifestly, the sleeve 121 may be substituted or used interchangeably with the sleeve 97 having the inclined or chamfered edge 98, in order to provide means for preventing the packing of the pulverized material into the passages 118 due to the weight of the sleeve 121 or the other material in the container or package pressing against or closing the passages 118. It will be manifest that, should the material be allowed to pack in the air passages 118, it would have a detrimental effect and would clog these passages when the container is returned to its upright position, so as to be used for atomization of the powder. Moreover, the permanently bent inclined feed tube 106 not only insures complete emptying of the contents of the container without loss or waste of the material, but also has the advantage that, when the container or package is to be filled with powder puffing material or the like, through the bottom, by a filling machine, the feed nozzle will not contact or strike the feed tube. The plug 105 may be substantially similar to the plug, previously described, and has a depending annular skirt 124 provided on its outer surface with an annular bead 125 which coacts with the flange-portion 126 (Fig. 18) to form a space 127 for receiving the yieldable flange 128 of the top 129, so as to releasably but firmly connect the plug to the container 102, when the parts are assembled.

In the modification disclosed in Figures 21 to 24, inclusive, the flexible squeeze-to-use container 130 is provided with a lid 131 having a central opening 132 into which is removably inserted a plastic plug 133 for receiving the upper end of the perforated feed tube 134, so as to eject the powder from the inside of the container 130, when one or more sides of the flexible container is squeezed or depressed. The plug 133 has a reduced tubular neck 135 provided with a top 136 formed with a discharge orifice 137. The plug 133 is provided with a central opening 138 which communicates with the tubular neck 135, so as to form an extension thereof (Fig. 22). The inner wall of the neck has a pair of longitudinally spaced elongated confronting ribs or lands 139 that extend from the underside of the plug 133 to the top 136 of the neck. Each of the ribs 139 is preferably formed with a long flat side 140 and an intersecting short flat side 141 (Fig. 24). The inner wall of the neck 135 adjacent the upper end thereof has oppositely disposed relatively short depending lugs or ribs 142, preferably shaped as shown in Figure 23, and which constitute depending stops or shoulders in the path of the feed tube 134 for limiting the movement thereof into the neck. It will be seen that, when the feed tube 134 is inserted into the neck 135, so as to abut the underside of the stop lugs 142 (Fig. 23), it also forms a large segmentally shaped air passage 143 (Fig. 24) on one side of the ribs 139 and two small air passages 144 and 145 on the other side of the ribs and opposite to each other. The space thus formed between the circumferentially spaced ribs 142 and which is confined by the top 136 and the upper edge of the tube 134, provides a mixing chamber 146 with which both the tube 134 and the spaced air passages 143, 144, and 145 communicate so as to insure proper mixture of the air and powder as well as the desired asperating effect during the dispensing operation. When the flexible tube 134 is inserted into the plug 133, spaced portions thereof will be slightly deformed (Fig. 24) but the tube will remain essentially round and be held firmly in place by contact with the adjacent inner curved wall of the neck and the ribs 139, so as to provide a tight seal and thus allow the escape of the material in the container therefrom only through the feed tube 134.

The discharge opening 137 in the neck 135 may be closed by a plastic cap 148 which is connected to the plug 133 by a flexible plastic strap 149. The inner wall of the cap 148 may have spaced interrupted grooves 150 (Fig. 22) for releasably engaging complementary beads or ribs 151 on the lower end of the neck 135, so as to provide a releasable cover or closure for the top of the plug when the parts are assembled.

Thus, it will be seen that, in all forms of the invention, a squeeze-to-use container is provided having simple, efficient, and economical means for insuring a proper mixture of the air in the container with the pulverous material or powder, as the material is withdrawn from the container through the feed tube and mixed with the air in the container above the powder. A proper mixture of the air and powder is then forced outwardly through the discharge orifice, so as to insure a maximum application of the material over a specified area at any desired point, irrespective of whether the container is in an upright, tilted, or inverted position.

It will be understood that the forms of the invention shown are merely illustrative and that such changes may be made as come within the scope of the following claims.

I claim:

1. A squeeze-to-use container for dispensing pulverous material, said container including a substantially cylindrical hollow body of flexible plastic material, metal closures secured to opposite ends of the body, one of the closures having a centrally disposed opening, a perforated feed tube within the container and of longer length than the interior of the container, a plastic plug connected to the wall of said opening, said plug having a horizontal base provided on one side with an annular depending skirt extending into said body and on its opposite side with a reduced outwardly projecting tubular portion provided with a restricted discharge orifice in the outer end thereof, the inner wall of said base and said tubular portion having circumferentially spaced axial grooves and interrupted segmental flanges between said grooves, the upper end of said feed tube extending inwardly into said tubular portion in engagement with the underside of said segmental flanges and beneath the top of the grooves, the upper end of the tube being spaced from the top of the tubular portion to provide a mixing chamber for receiving the pulverous material when the flexible body is squeezed so as to insure a mixture of the material with the air forced upwardly through said grooves prior to the material being discharged through said orifice.

2. A squeeze-to-use container for dispensing pulverized material, said container including a hollow flexible body, closures secured to opposite ends of the body, one of the closures having a centrally disposed opening, a tubular plug connected at the wall of said opening and having an end portion extending outwardly therefrom, said end portion having a restricted discharge orifice, the inner surface of said plug being formed with spaced vertical grooves and interrupted segmental stop flanges, said flanges coacting with the top to form a mixing chamber, a feed tube within the container, said feed tube having a perforated lower end portion and a hole adjacent its upper end portion, a stop shoulder secured to the feed tube below said hole, a valve sleeve slidably mounted on the tube above said stop shoulder and arranged when the container is in a vertical position to close said hole, said sleeve when the container is tilted or inverted being slidable on said tube so as to engage the underside of said plug, said sleeve having means at one end thereof for closing certain of the grooves in said plug and allowing the others to remain open so as to prevent the packing of the pulverized material in said grooves.

3. A squeeze-to-use container for dispensing pulverized material, said container including a hollow flexible body having closed ends, one of the closed ends having an opening, a plug closing said opening, said plug having a reduced neck extending outwardly therefrom, said neck having a restricted discharge orifice, the inner wall of said neck having circumferentially spaced ribs extending longitudinally thereof, said ribs at the upper ends terminating in inwardly extending stop lugs, a perforated feed tube within said container, said feed tube coacting with the top of the neck to form a mixing chamber between the lugs, said lugs serving to limit the upward movement of the feed tube into the neck, a coupling member for connecting the feed tube to said plug, said coupling member including a tubular portion provided with a stop collar and having one end extending into said neck and cooperating with said ribs to define passages for admitting air to the mixing chamber from the interior of the container when the latter is upright and for admitting pulverized material to the mixing chamber when the container is tilted or inverted, a sleeve slidable on said tubular portion between said stop and said plug, and means on said sleeve for preventing packing of the pulverized material in said passages when the container is tilted or inverted.

4. A squeeze-to-use container, as called for in claim 3, in which the means on said sleeve for preventing the packing of the pulverized material includes providing the upper edge of the sleeve with an inclined surface arranged to engage the underside of the plug, when the container is tilted or inverted.

5. A squeeze-to-use container, as called for in claim 3, in which the means for preventing packing of the pulverized material includes spaced projections on the upper edge of the sleeve arranged to engage the underside of the plug when the container is tilted or inverted.

6. A squeeze-to-use container for dispensing pulverized material, said container including a hollow flexible body having closed ends, one of the closed ends having an opening, a plug closing said opening, said plug having a reduced tubular end portion extending outwardly therefrom, said end portion having a restricted discharge orifice, a perforated feed tube within the container, conduit providing means connected to the tube and extending into said end portion for forming a mixing chamber below said discharge orifice and having an aperture adjacent said plug connecting the conduit with the interior of the container, means in said end portion forming longitudinally extending air passages for, when the container is upright, communicating the interior of the container above the pulverized material with said mixing chamber, and a slidable sleeve valve mounted on said conduit providing means for closing said aperture when the container is in upright position and for opening said aperture when the container is tilted or inverted, the parts being constructed and arranged so that upon the squeezing of the flexible body with the container upright the pulverized material is forced upwardly through the feed tube and mingles with the air in the mixing chamber prior to the discharge of the mixture through said orifice, and when the body is squeezed with the container inverted, the pulverized material is forced through said passages and aperture and mingles in said mixing chamber prior to the discharge of the mixture with air supplied to the mixing chmaber via said feed tube.

7. A squeeze-to-use container for dispensing pulverized material, said container including a hollow flexible body, closures secured to opposite ends of the body, one of the closures having a centrally disposed opening, a perforated feed tube within the container and of longer length than the interior of the container, a plastic plug connected to the wall of the opening and having a reduced tubular end portion extending outwardly therefrom, said end portion having a restricted discharge orifice, said feed tube having a hole therein adjacent said plug and having its upper end portion extending into said tubular end and spaced from said orifice to form a mixing chamber beneath the same, means forming passages for, when the container is upright, allowing air in the container above the pulverized material to be conducted to said mixing chamber, a sleeve valve slidable on said feed tube for closing said hole when the container is in an upright position, said sleeve valve being movable on said feed tube away from said hole and into engagement with said plug when the container is inverted or tilted, and means on said sleeve valve for preventing packing or pulverized material into said passages when the container is inverted or tilted, said container being operable so that when the flexible body is squeezed with the container upright the pulverized material is forced upwardly through said tube into the mixing chamber and at the same time air from the container above the material therein is forced into the mixing chamber so as to mix and be discharged with the pulverized material, and when the body is squeezed with the container inverted the pulverized material is forced through said passages and hole and into said mixing chamber and at the same time air from the container via the feed tube is forced into the mixing chamber so as to mix and be discharged with the pulverized material.

8. A squeeze-to-use container for dispensing pulverized material including a hollow flexible body having closed ends and being squeezable only transversely between said ends, one of the closed ends having an opening, a plug for closing said opening, said plug having a tubular end portion extending outwardly therefrom and having a top provided with a restricted discharge orifice, the inner surface of said tubular portion having spaced elongate ribs extending downwardly from the top thereof, the inner surface of said tubular end portion also having stop means spaced somewhat below the top of the plug; a feed tube within the container extending generally from end to end thereof with one end associated with the plug and the other remote therefrom, said tube having several openings adjacent the remote end and having its associated end portion introduced into the tubular end portion of said plug in firmly gripped engagement with said spaced ribs and with its end surface abutting said stop means, the upper tube end coacting with the top of the tubular member to form a mixing chamber, and the exterior surface of the feed tube inserted into said plug coacting with ribs and the inner surface of the tubular end portion to form a passage in addition to the feed tube for connecting the interior of the container with said mixing chamber, whereby powder and air within the container are, upon squeezing the latter, caused to pass simultaneously through the feed tube and the passage to the mixing chamber to be mixed therein, and are thence dispensed in mixed condition through said orifice.

9. The container as set forth in claim 8 in which the hollow flexible body comprises a flexible plastic tube closed by transverse rigid end closure members, one of which is provided with the said opening, and in which the plug is of plastic material resiliently held in sealing relation in said opening.

10. The container as set forth in claim 9 in which the rigid end closure members are flanged metallic members seamed into sealing engagement with the ends of the tube.

11. A container in accordance with claim 8 in which the ribs are arranged to grip the upper end of the feed tube between themselves and one side of the tubular end portion in an off-center position whereby the passage area exteriorly of the feed tube is concentrated in a passage of relatively large cross-section at one side of the feed tube.

References Cited in the file of this patent

UNITED STATES PATENTS

| Number | Name | Date |
|---|---|---|
| 1,607,774 | Morse | Nov. 23, 1926 |
| 2,202,079 | Ayres | May 28, 1940 |
| 2,219,208 | Knight | Oct. 22, 1940 |
| 2,408,058 | Gallagher | Sept. 24, 1946 |
| 2,483,148 | Nicolle | Sept. 27, 1949 |
| 2,501,047 | Gustafsson et al. | Mar. 21, 1950 |
| 2,547,718 | Patholm | Apr. 3, 1951 |
| 2,573,731 | Ryhberg et al. | Nov. 6, 1951 |
| 2,580,580 | Nicolle | Jan. 1, 1952 |
| 2,631,064 | Tupper | Mar. 10, 1953 |
| 2,716,836 | Winkelstrater | Sept. 6, 1955 |
| 2,718,987 | Kimball | Sept. 27, 1955 |